May 20, 1952  R. D. SWEENY ET AL  2,597,402
AUTOMATIC VALVE
Filed May 10, 1945
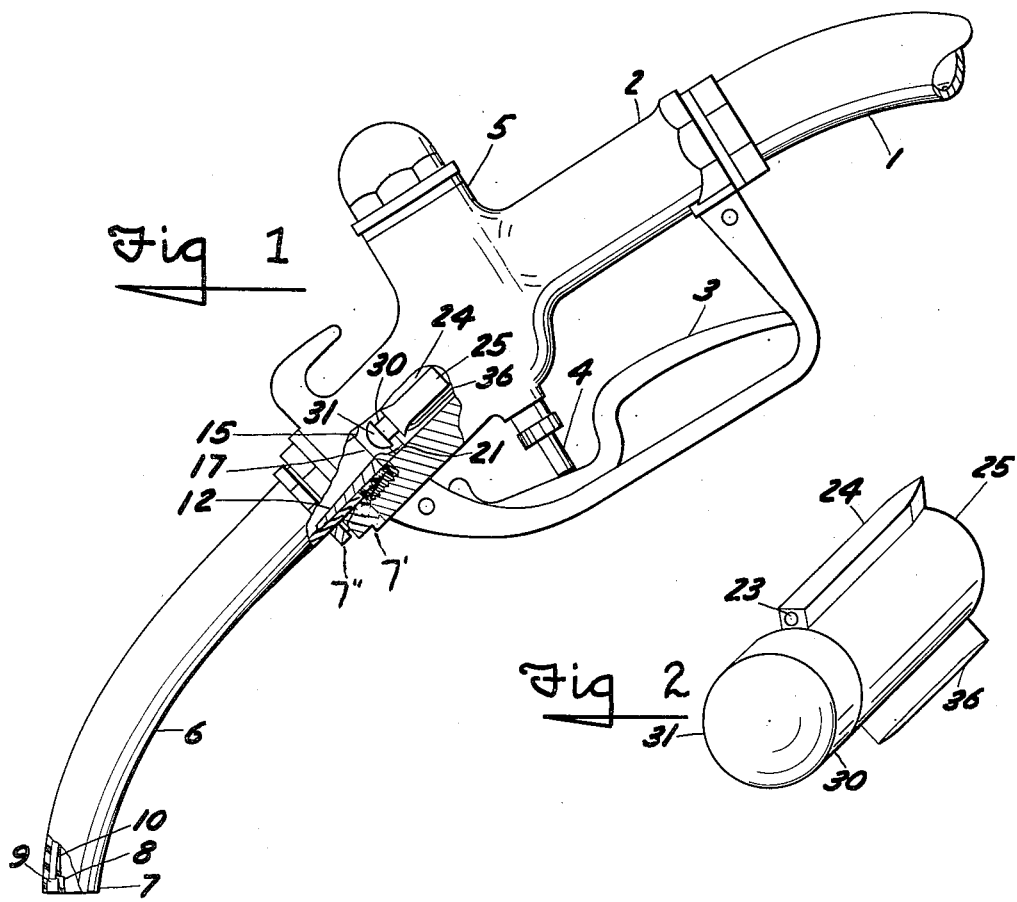
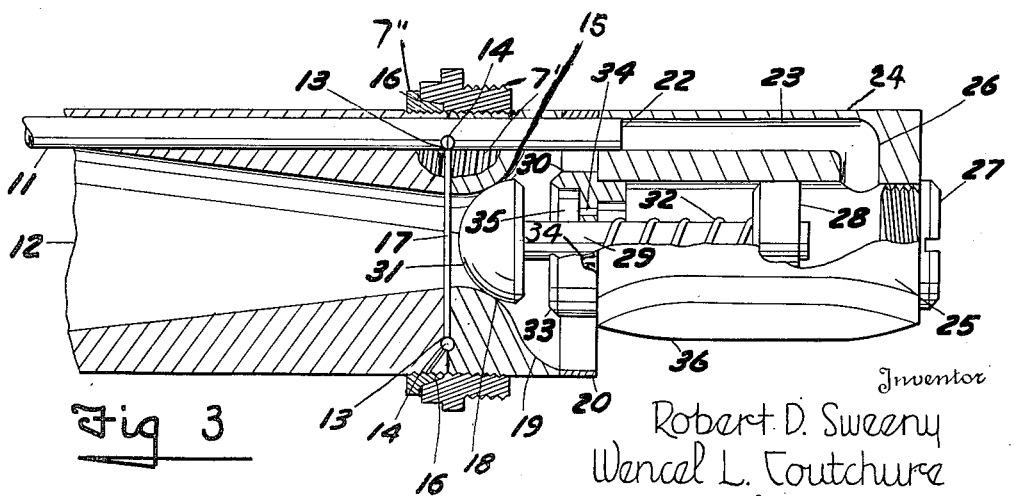
Inventor
Robert D. Sweeny
Wencel L. Coutchure
By
Geo E Kirk
Attorney Patented May 20, 1952

2,597,402

UNITED STATES PATENT OFFICE 2,597,402

AUTOMATIC VALVE

Robert D. Sweeny and Wencel L. Coutchure, Toledo, Ohio, assignors to Wm. H. Cook, trustee, Toledo, Ohio Application May 10, 1945, Serial No. 593,068

3 Claims. (Cl. 226—127)

This invention relates to self-closing and self-opening valves.

This invention has utility in those instances wherein it is the purpose fully to charge a receptacle, with avoidance of overflow or waste, specifically in filling the fuel tanks of motor vehicles. An adaptation involves installation of the unit between the control valve for the liquid supply and the pouring spout or nozzle proper. In accordance with an embodiment hereof, a special throat Venturi intermediate nozzle is provided, with a Venturi - disturbance - actuated plunger valve to plug the throat.

Referring to the drawings:

Fig. 1 is a side elevation, with parts broken away, of a gasolene pouring nozzle, having the invention hereof incorporated therewith;

Fig. 2 is a perspective showing of the Venturi control unit comprising the plunger valve and its cylindrical housing;

Fig. 3 is an enlarged, longitudinal section of the special Venturi device, with the plunger valve here in closed position, instead of open as shown in Fig. 1.

A gasoline supply hose 1 is herein shown provided with a fitting 2 with a finger grasp lever portion 3 to be effective in pushing a valve stem 4 into a valve housing portion 5 of the fitting 2, thereby to release for flow the gasolene under the head provided by pump means to the hose 1. The liquid flow thru the fitting 2 and past the open main valve in the housing portion 5, as manually controlled, is by way of a pouring spout 6 having an outlet 7. Friction coupling nuts 7', 7'', assemble the spout 6 with the fitting having the housing 5.

A ledge 8 provides a set back for an intake end 9 of a duct 10 which continues as a duct 11 back from the spout 6 lengthwise thru a wall of a diffuser section or spread nozzle 12 of a Venturi type. The inward end of the section 12 has a ring groove 13 complemental to a ring groove 14 in a throat section 15. The sections 12, 15, have outward planar face portions 16. Inwardly from the groove 13, as a branch from the duct 11, there is port communication 17 to the region of the throat 15. This communication 17 is in the form of an inwardly open endless slot formed by clearance between the sections 12, 15, inward from the groove 13. The communication 17 provides a way for inflow to the venturi as induced by flow through the throat to the diffuser section 12. The opposite or supply side of the throat in the section 15 has a convex region 18 merging into a zone region 19 to form a sort of ogee curve for the cross-section of this throat entrance section 15.

The Venturi portion of the control comprising the sections 12 and 15 may be spaced by either a ring 20 (Fig. 3) or a different length ring 21 (Fig. 1). Special length rings 20 or 21 (see Fig. 1) are selected to vary the clearance between the convex region 18 and valve face 31 in nicely responding to the character of fluid being handled. As a continuous passage from the port 9, by way of the ducts 10, 11, there is not only communication with the ring duct 13, 14, but end 22 of the duct 11, is slidable to the distance adjusted by the selected ring into register with a passage 23 in a rib 24 of a cylinder 25. The passage 23 has a port 26 just inward from a cylinder closing plug 27.

In the cylinder 25 is a piston 28 having a piston rod or valve stem 29 extending thru a cylinder head 30 to a spherical seat portion plunger valve 31. A compression helical spring 32 about the rod 29 between the head 30 and the piston 28 serves normally to hold the valve 31, against a seat 33 at the cylinder head 30. A plurality of ports 34 thru the head 30 allow appropriate flow cooperation for sealing stability for the valve 31 as open, due to clearing of a chamber portion 35 in the outer side of the head 30 from any interferring liquid or gas accumulation. Conversely, movement of the piston 28 toward the head 30, may not be clogged, due to the ports 34 allowing escape flow from the cylinder 25.

The cylinder 25 is centered in the passage leading to the Venturi type device of the sections 12, 15, by the rib 24 and additional ribs 36. The normal flow-way of the liquid supply from the duct 1 and past the open valve in the housing 5 accordingly is about or outside the cylinder 25 into the restricting zone 19 then over the convex entrance portion 18 to the suction throat endless slot region 17 into the diffuser nozzle 12 tapering outward 8°.

The curve continuity thruout the throat entrance is a factor in symmetrical flow thru the throat into the nozzle passage portion 12. The velocity of this flow over the throat port 17 entrains air and creates a suction communicated to the ring passage 13, 14, and the duct 11. While the spring 32 may not be required to be critical in its adjustment, it is sufficiently effective for normally seating the valve 31 at the seat 33, for fully open position. Accordingly to stabilize this plunger valve 31, the suction from the throat port 17 to the passage 13, 14, duct 11, has communication thru the passage 23 and the port 26 to the side of the piston 28 in the cylinder 25, toward the cylinder head 27. There is thus provided, due to the suction action transmitted from the venturi, an automatic reinforcement for the spring 32. Thus free flow in a ⅜" internal diameter of the throat for the pouring spout 6 has been in ranges of 5 to 25 gallons per minute, at pressures ranging from 15# to 60# per sq. in. for the liquid supply, and with temperatures, even for gasolene from below 60° F. up to 108° F. At normal operation, say around 30# per sq. in. pressure for the liquid supply, with gasolene around 68° B. gravity at 60° F. the suction has been as much as 9" of water below atmospheric pressure.

One of the control means for disturbance response herein, is thru the duct 10 to the region of the pouring spout outlet 7. With the duct intake end or port 9 of the control means spaced slightly back from the outlet 7, there is physical protection from jamming, as well as isolation from steam outflow. At once when the outlet 7 is submerged, the automatic control herein functions. This means that the operator who may locate the pouring spout 6 in a gasoline tank of a motor vehicle and being unable to know the extent of filling which is taking place within such receptacle, may not experience overflow or waste. When the liquid rises to the outlet 7, the suction action transmitted thru the duct 10, carries liquid. The pneumatic modifying means for the valve 31 is now disturbed. Since a gas flows more freely than a liquid through the narrow slot port 17, the suction of liquid up through the duct 11 and into said slot port 17, thereby cuts out the suction produced from said port 17 by the venturi. The cutting-off of this suction produces an impulse or surge of a relative increase in pressure in the duct 22 which is communicated to the cylinder 25 to press the piston 28 toward the left in Fig. 3 and unseat the valve 31 from its home seat 33 and move it towards its seat 18. As soon as the valve 31 is moved out into the stream of liquid flowing into the venturi, the movement of the liquid in the stream aids in drawing and forcing the valve 31 into contact against its seat 18 at the Venturi throat thereby to cut off the flow of the liquid through the nozzle.

Shutting off of the supply valve in the housing portion 5 releases the pressure back of the valve 31. As so released, the spring 32 resets the valve 31 to open position for a repetition of the cycle of automatic control operation herein.

Thruout the maintenance of liquid phase for the material flowing, there is uniform flow from the automatic unit herein disclosed. This means that a duct with which there is installed the unit hereof, has the flow thru such duct subject to the automatic control even for a wide range of liquids. The response is experienced with heavy free flowing liquids to very light substances. So long as the liquid from water to 100 octane gasolene retains fully the traits of a liquid, the control does not act. Contamination from foaming, slight sudsing, vapors, films, or drops of condensation entering the duct 10, immediately acts to disturb the suction at the port 17. While a liquid drop may clog a more concentrated port, the endless slot 17. which for motor fuels may be in the range of .010" to .015" in width, develops a peripheral symmetry. This means that when sufficient occasion arises automatically calling for the valve to be closed, closing forthwith takes place, for with the slot 17 clogged with liquid, the suction theretofore as a pull to act on the passages from the port 9, thru the ways 10, 11, 23, 26, to the cylinder 25 between the piston 28 and the cylinder head 27, is now released. Only the spring 32 now directs the valve 31 against the seat 33, and this holding action of the spring 32 is not sufficient to overcome the draw of the stream flow about the cylinder 25 between the ribs 24, 26. This stream flow is directed by the curved faces 19, 18, and develops a pull on the convex face of the valve 31 to cause the valve 31 to leave the seat 33 and lodge at the face 18 to close the throat 15.

With more volatile liquids, temperature rise in the supply, even from pumping, may cause the release of some vapor at the discharge outlet 7. As such condition arises, this control unit may act as a tell-tale. Such a pressure release is a supersaturated gas, at once developing, if not actually entraining condensation. The in-draw of the duct 10 so carrying lack of true gas, brings about the closing of the valve 31 against the seat 18.

Increasing the length of the ring or sleeve 20, say by insertion of the sleeve 21 to increase the spacing between the valve 31 at the seat 33, in clearance as to the seat 18 as much as .015", renders the control more stable for a selected liquid.

What is claimed and it is desired to secure by Letters Patent is:

1. In a hose nozzle having an outlet a control mechanism for automatically shutting off the flow of liquid through said nozzle when said outlet is submerged in liquid, said mechanism comprising: a venturi in said nozzle spaced away from said outlet, a valve on the intake side of said venturi for controlling flow through said nozzle, a cylinder, a piston operating in said cylinder to actuate said valve on the intake side of said venturi to cut off the flow of liquid through said nozzle, an annular slot around the throat of said venturi, and a duct commuicating from near said outlet to said piston with a branch duct communicating with and around said slot, whereby liquid flows through said venturi as long as the outlet end of said duct is unsubmerged to maintain said valve open, but when said outlet end of said duct is submerged the suction from said slot draws liquid through said duct into said slot cutting off its suction thereby creating an increased pressure surge in said duct to said piston to operate said piston to push said valve toward said intake side of said Venturi section to cut off the flow of liquid through said nozzle.

2. The nozzle of claim 1 wherein a selectable length ring provides spacing between said first seat and said valve when said valve is against said second seat thereby establishing a predetermined spacing for the flow of liquid by said valve.

3. A hose nozzle for dispensing liquids comprising a Venturi section in said nozzle, a cut-off valve for controlling the liquid flowing through said nozzle before said Venturi section, a first seat for said valve adjacent the throat of said Venturi section, a stem connected to said valve, a cylinder closed at one end and having a second seat for said valve at the other end, a spring in said cylinder on said stem to normally maintain said valve against said second seat for there closing said other end of said cylinder, an annular slot in the throat of said venturi, a common duct connecting said outlet end of said nozzle with said slot and from said slot to said other end of said cylinder whereby air may be sucked from said outlet and said cylinder through said duct by the aspiratory effect to said venturi when liquid flows through said venturi, said suction aiding the operation of said spring in said cylinder to maintain said valve against said second seat as long as air may pass through said duct and said slot, and whereby said valve closes against said first seat when the suction through said duct is stopped by liquid drawn into said slot from the immersion of the outlet of said nozzle into a liquid to produce a relative increase in pressure surge in said cylinder to unseat said valve from said second seat against the action of said spring and to move said valve into the stream of liquid flowing through said nozzle into said venturi which flowing stream aids in drawing said valve against said second seat thereby shutting off said flow and preventing the rise of the liquid level into which the end of said nozzle is immersed.

ROBERT D. SWEENY.
WENCEL L. COUTCHURE.

REFERENCES CITED

The following references are of record in the file of this patent:

UNITED STATES PATENTS

| Number | Name | Date |
| --- | --- | --- |
| 2,111,852 | Flinchbaugh | Mar. 22, 1938 |
| 2,244,947 | Hargiss | June 10, 1941 |
| 2,330,704 | Grise | Sept. 28, 1943 |